Jan. 12, 1954  F. H. HOLWICK  2,665,795
SKIRT PLATE AND SKIRT SEAL CONSTRUCTION FOR CONVEYER BELTS
Filed Dec. 21, 1951  2 Sheets-Sheet 1

Inventor
FRED H. HOLWICK

Jan. 12, 1954          F. H. HOLWICK          2,665,795
SKIRT PLATE AND SKIRT SEAL CONSTRUCTION FOR CONVEYER BELTS
Filed Dec. 21, 1951          2 Sheets-Sheet 2
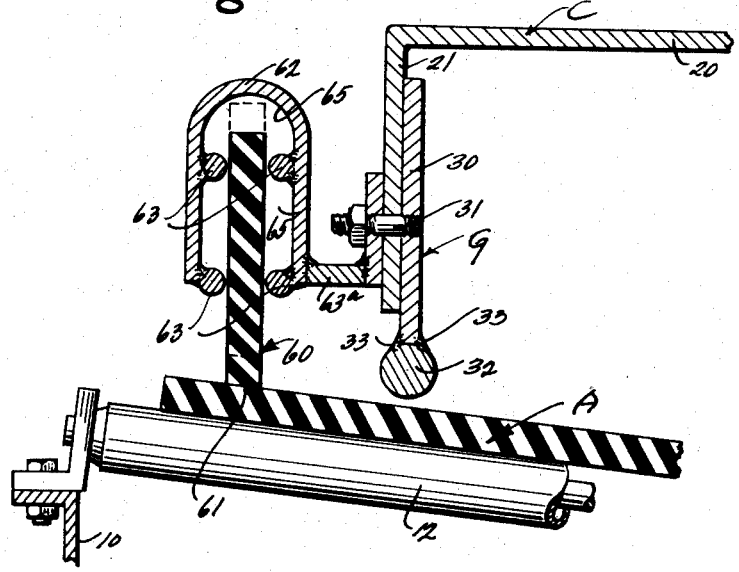
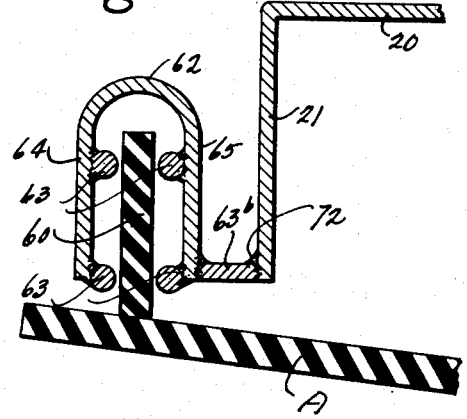
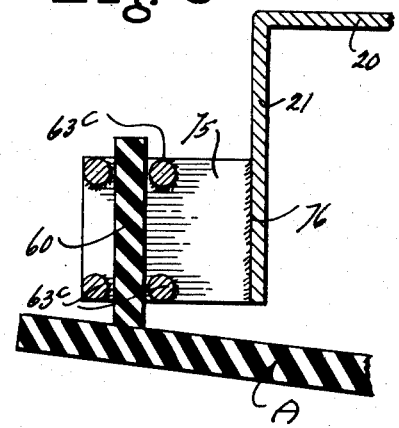
Inventor
FRED H. HOLWICK
By
Attorneys Patented Jan. 12, 1954

2,665,795

UNITED STATES PATENT OFFICE 2,665,795

SKIRT PLATE AND SKIRT SEAL CONSTRUCTION FOR CONVEYER BELTS

Fred H. Holwick, Meredosia, Ill.

Application December 21, 1951, Serial No. 262,721

7 Claims. (Cl. 198—204)

This invention relates to improvements in sealing means to prevent the lateral displacement of material being hauled by a conveyor belt.

The primary object of this invention is the provision of lateral sealing means for coal conveyor belts which is relatively inexpensive and requires a minimum of maintenance and replacement of parts.

In the art relating to coal conveyor belts it has been found that lateral sealing members permit particles of the material being conveyed to wedge between the sealing member and the belt. This results in abrading of the sealing member and also the belt. At first small particles will wedge between the sealing member and the belt and then as the parts become worn larger particles also become wedged therebetween. The belt will not yield downwardly and the result is that the particles will remain in wedged position until the belt or the skirt or the object or all of them become worn to the point where the particle will be released. This results in severe damage to the belt and the skirt. Conventional seals have been known to last only a few weeks under such conditions. To replace a new belt seal requires several hours to install, and during this time, the belt is out of operation. Replacement of a belt is extremely expensive and it is not infrequent that belts are damaged to the extent of having long cuts the entire length of the belt. This necessitates expensive replacement or repair. It is therefore an object of the present invention to provide a marginal sealing construction for coal conveying belts, or conveyor belts adapted to haul or convey other materials which will ward off and control the particles tending to become laterally displaced; the construction being such that such particles will be easily released as the conveyor travels forwardly, without the occurrence of any appreciable wear upon the sealing skirt construction or the belt.

A further object of this invention is the provision of conveyor belt sealing means, including a sealing construction for warding off and controlling the path of travel of larger conveyed particles, and additional skirt sealing means for preventing and controlling the lateral displacement of finer particles which pass from the first sealing means to the latter, without incidental wear upon either the sealing constructions or the conveyor belt.

Other objects and advantages of this invention will be apparent during the course of the following detailed description.

In the accompanying drawings, forming a part of this specification, and wherein similar reference characters designate corresponding parts throughout the several views:

Figure 4 is an enlarged transverse cross sectional view taken substantially on the line 4—4 of Figure 1.

Figure 5 is a fragmentary cross sectional view showing a second modified form of sealing means.

Figure 6 is a fragmentary cross sectional view showing still another modified form of sealing means.

Figure 1:
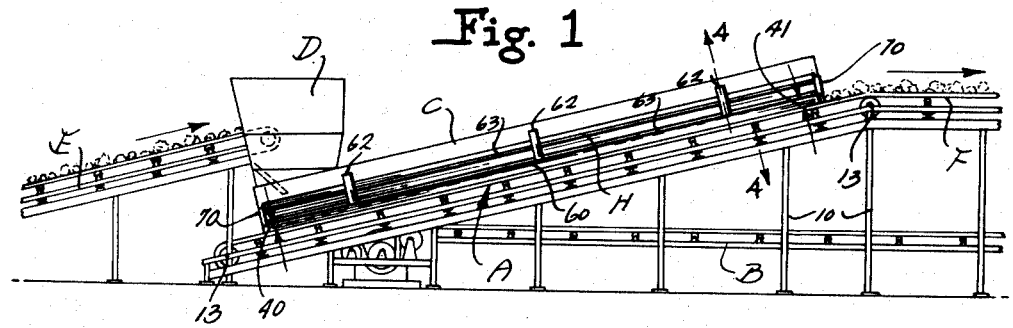
Figure 1 is a side elevation of a conventional coal conveyor assemblage, showing an improved sealing construction associated therewith.
Figure 2:
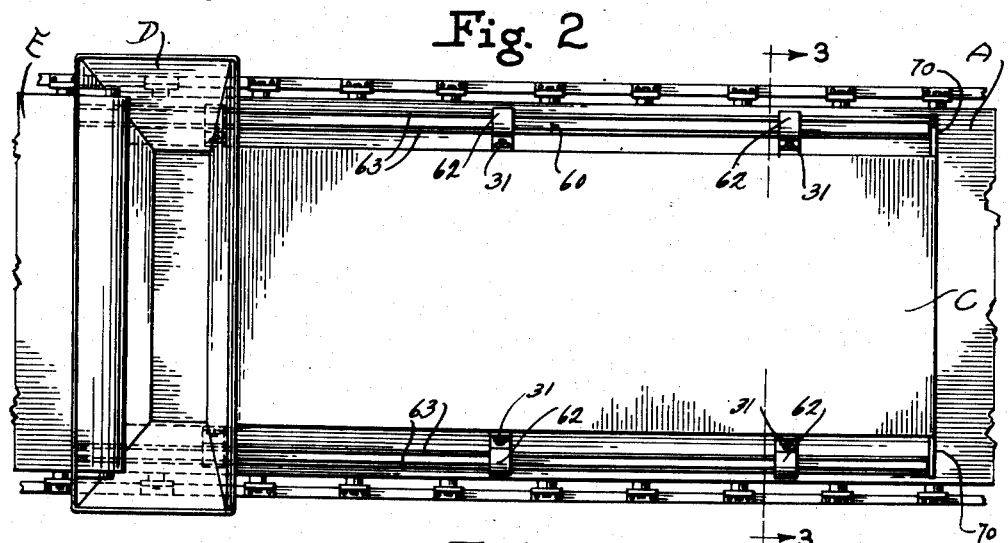
Figure 2 is a plan view of the details shown in Figure 1.

In the drawings, wherein for the purpose of illustration is shown preferred and modified forms of the invention, the letter A may generally designate a tail end conveyor belt adaptable for hauling and conveying coal, having a supporting frame B associated therewith. For this type of tail end conveyor belt a chute housing C is used together with a hopper D. The coal is deposited upon the tail end conveyor belt A by means of the conventional belt construction E, and coal is deposited from the belt A onto the open belt F at the head of the conveyor assemblage. The improved sealing construction associated with the tail end conveyor belt A includes an improved plate skirt construction G and a rubber skirt sealing construction H.

The details of the belts E and F are well understood in the art and will not be further described. The details of the conventional tail end conveyor belt A are likewise conventional. The framework B includes supporting standards 10, cross rails 11, and rollers 12 for supporting the top tread of the belt. The side-most rollers 12 are canted at the usual angle to provide a pocketed effect for the top tread of the belt, upon which the material is conveyed and supported. The belt A has rollers 13 supporting the ends thereof upon the framework B.

The chute housing C is suitably supported by the framework B or by any other framework structure, and it includes a top wall 20 and depending housing skirts or walls 21 at the sides thereof, which are spaced at their lower edges above the top of the belt A.

As is usual, the coal is received from the belt E and fed into a hopper D and therefrom is deposited onto the tail end conveyor belt A. It is necessary to provide lateral seals upon the conveyor belt A, because the material is deposited in rather turbulent condition upon the belt A so that it is necessary to control the coal or other material until it has settled and reached the end of the incline of the tail end conveyor belt A. It is for this reason that sealing plates are provided upon such belts.

Referring to the improved plate skirt G and the rubber skirt seal construction H, the objects above enumerated describe the purpose of the same.

Each plate skirt construction G preferably consists of a body plate 30, preferably of steel. It is bolted, as by bolt structures 31, at frequent intervals to and along the old skirt wall 21 of the chute construction C, as shown in Figure 4. At its lower margin, the skirt plate body 30 is provided with a cylindrical rod or bar portion 32. The latter may be welded, as at 33, to the lower edge of the body 30. The rod surfaces facing the belts A are all convexed and project laterally beyond the planes of the inner and outer surfaces of the plate 30, as can be seen in Figure 4 of the drawings. The body 30 and its particle engaging lower rod portion 32 are so bolted or secured to the supporting framework that the spacing (about $\frac{1}{16}$ of an inch) of the lowermost surface of the portion 32 with respect to the top surface of the belt A at the extreme lower of the tail end conveyor belt A, designated by the numeral 40 in Figure 1 of the drawings, is less than the spacing designated at 41 in Figure 1 of the drawings at the head end of the belt A between the top surface of the belt and the bottom surface of the rod 32. The convexed surfacing of the portion 32 of the plate seal tends to ward off coal particles and to prevent tendency of the same to lodge beneath the same and the belt. The finer particles will move thus the space between the belt and the lower edge of the rod 32. A dotted line in Figure 1 designates the lower edge of the rod 32 and the spacing between it and the top of the belt A gradually increases from the tail end of the belt A to the head end thereof. This insures that the particles gliding along the belt will pass along with the travel of the belt without binding.

Figure 3:
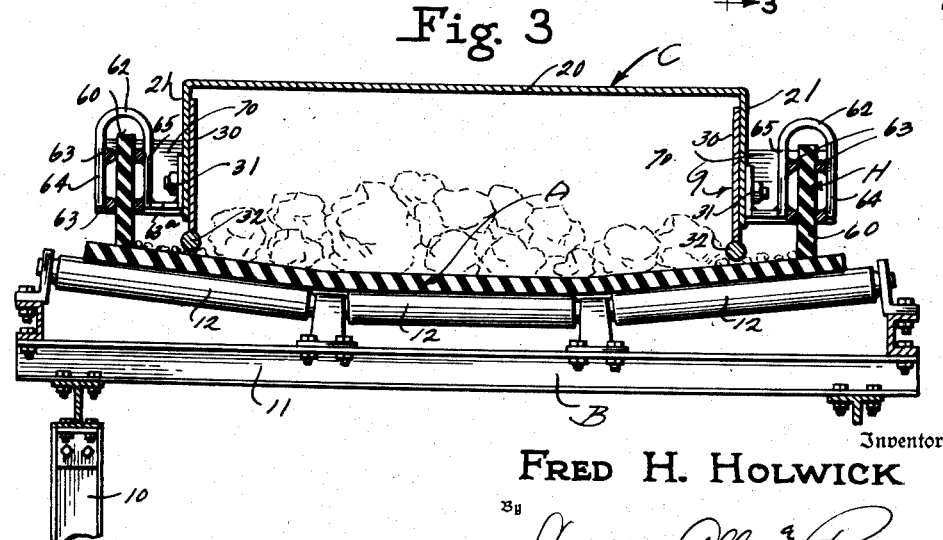
Figure 3 is an enlarged transverse cross sectional view taken substantially on the line 3—3 of Figure 2.

Referring to the rubber skirt seal construction H, the same principally comprises an elongated rubber plate 60, of hard rubber or plastic about the same in nature and consistency as automobile casing tire rubber or a shoe rubber heel. The lower edge 61 rests in engagement with the top surface of the belt A, laterally beyond the skirt plate construction G. The means for supporting the plate 60 in position permits it to move vertically. This means consists of inverted U-shaped guide members 62 having bracket means 63ª. The latter are attached to chute housing C, by the bolts 31, as shown in Figures 3 and 4. I provide guide bars 63 supported by the leg portions 64 and 65 of each inverted U-shaped member 62, upon the inside surfacing thereof. They project into the chamber 65 of the guide member 62 and present convex surfacing to the side surfaces of the rubber skirt 60, as shown in Figure 4. The clearance between each side of the skirt 60 and the adjacent convex surfacing of the guide bar 63 is approximately $\frac{1}{16}$ inch. For coal conveying purposes, the rubber skirt plate 60 is approximately one-half of an inch thick and five inches in vertical height, and of a length to suit the length of the belt A.

In Figure 1 is shown the location of the supporting means for the bars 63, consisting of the bracket 63ª and the inverted U-shaped member 62. They are placed at desired intervals (about three feet apart). At the head and tail ends stop plates 70 are held by the framework to limit the endwise movement of the vertically movable rubber skirt plate 60.

In lieu of connecting the brackets 63ª to the bolt structures 31, as shown in Figure 4, I may provide a bracket extension 63ᵇ, welded at 72 to the lower margin of the chute housing skirt wall 21.

As a further modification, the rods 63ᶜ, shown in Figure 6, which corresponds to the rods 63 of the form of invention shown in Figure 4 may be supported by laterally extending bracket plates 75, welded at 76 to the chute wall 21. This construction may be used in event the tail end conveyor belt A is not very long.

The rubber skirt plate has free vertical movement to prevent particles from binding beneath the same. Under such conditions the plate will rise and permit the object to pass laterally from the seal. The latter then reseats itself. The convexed surfacing of the guide rods 63 insures that nothing will become wedged between said rods and the seal plate. Thus, the seal plate will have free movement at all times.

It has been found that the lower edge 61 of the seal plate will become glazed after it is in use a short time. In use, the finer particles passing under the steel skirt plate will then engage the rubber seal and travel along the belt to the head end thereof.

Under experimental tests lasting for a period of eighteen months, it was found that actual wear upon the rubber skirt plate amounted to less than $\frac{1}{16}$ of an inch. Not the least important feature of the improved sealing construction is the fact that rubber seal plate can be replaced in its frame in about thirty seconds, and requires practically no attention thereafter. The steel plate 30 requires about thirty minutes for one man to replace and remove, and from the wear noticed upon the same during experimental tests it was noted that the wear was such that this type of plate skirt G will undoubtedly last several years before requiring repairs or replacements.

Various changes in the shape, size and arrangement of parts may be made to the form of invention herein shown and described, without departing from the spirit of the invention or scope of the claims.

I claim:

1. Skirt sealing means for conveyor belts comprising in combination with a movable conveyor belt, a sealing plate of material of rubber like nature, and means supporting said seal for vertical movement with respect to the belt in freely resting relation solely by gravity over and upon the belt at a side marginal portion thereof whereby upon the application of a lifting force upon the skirt caused by the wedging of particles being carried by the belt between the belt and lower edge of the skirt, said skirt will be vertically lifted to permit the particles to be released.

2. In skirt sealing means for conveyor belts the combination with a movable conveyor belt, of skirt sealing plates, framework means vertically supporting said plates at and over the side marginal portions of the belt and in contact with the belt for vertical movement, said framework means including convexed rounded surfacing spaced slightly at each side of the plate for guiding the vertical movement of the same.

3. In a skirt sealing construction for conveyor belts the combination with a conveyor belt having an upper tread for the support and conveyance of materials thereon, a first sealing construction, means mounting said first sealing construction at each side marginal portion of the upper tread so that its lower surfacing is slightly spaced from the top surface of said tread for the warding off of larger particles being carried by said belt, a rubber like plate seal, and means supporting said rubber like plate seal over and in contact with the upper surface of the belt at the side marginal edges thereof outwardly beyond said first mentioned sealing means for vertical movement whereby to direct the finer particles passing under said first-mentioned sealing means for travel along the belt.

4. In skirt sealing means for conveyor belts, the combination with a conveyor belt of a plurality of relatively spaced skirt seals at each of the side marginal portions of the belt disposed over the belt, the innermost skirt seal being supported in spaced relation above the belt and the outermost skirt seal directly engaging the tread surfacing of the belt, and means supporting the last-mentioned plate seal for vertical movement.

5. In skirt sealing constructions for conveyor belts the combination with a movable conveyor belt and its supporting framework, a metal skirt plate for each marginal side of the conveyor belt, a rubber skirt plate for each marginal side of the conveyor belt, framework means supporting the metal skirt plate with its marginal surface closely spaced above the top surface of the conveyor belt for warding off the larger particles being conveyed by the belt, and framework means supporting the rubber skirt plate outwardly beyond the metallic skirt plate in direct contact resting relation upon the conveyor belt for free vertical movement with respect thereto.

6. A skirt sealing construction, as set forth in claim 5, wherein the lower marginal portion of the metallic skirt plate is shaped in the form of a rod bulging beyond the side surfaces of the said metal skirt plate and presenting downwardly convexed surfacing and laterally convexed surfacing with the convex surfacing spaced from the top surface of the belt with gradually increasing dimension in the direction of travel of the belt.

7. In skirt sealing means for conveyor belts the combination with a movable conveyor belt and its supporting means, skirt sealing plates, means supporting said plates at the sides of the belt as barriers and guides for the material being carried upon the belt with the extreme lower edges of said plates facing the belt spaced slightly therefrom, and other seals laterally and outwardly of the sealing plates above mentioned and spaced therefrom having the lower edges thereof contacting and resting upon the belts, and means supporting said seals last mentioned for free vertical movement.

FRED H. HOLWICK.

References Cited in the file of this patent
UNITED STATES PATENTS

| Number | Name | Date |
|---|---|---|
| 782,772 | Bivert | Feb. 14, 1905 |
| 1,422,002 | Shaw | July 4, 1922 |
| 2,323,368 | Biedess | July 6, 1943 |
| 2,493,451 | Gaddis et al. | Jan. 3, 1950 |